(12) United States Patent
Matsuura et al.

(10) Patent No.: US 11,378,144 B2
(45) Date of Patent: Jul. 5, 2022

(54) CLUTCH CONTROL DEVICE (71) Applicant: HONDA MOTOR CO., LTD., Tokyo (JP)

(72) Inventors: Kohei Matsuura, Wako (JP); Junya Ono, Wako (JP); Tatsuya Ryuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/260,626

(22) PCT Filed: Jun. 6, 2019

(86) PCT No.: PCT/JP2019/022509
§ 371 (c)(1),
(2) Date: Jan. 15, 2021

(87) PCT Pub. No.: WO2020/017178
PCT Pub. Date: Jan. 23, 2020

(65) Prior Publication Data
US 2021/0277966 A1 Sep. 9, 2021

(30) Foreign Application Priority Data
Jul. 19, 2018 (JP) .............................. JP2018-135955

(51) Int. Cl.
*F16D 48/08* (2006.01)
(52) U.S. Cl.
CPC ...... *F16D 48/08* (2013.01); *F16D 2500/1026* (2013.01); *F16D 2500/10412* (2013.01); *F16D 2500/304* (2013.01); *F16D 2500/3024* (2013.01); *F16D 2500/3026* (2013.01); *F16D 2500/3166* (2013.01);
(Continued)

(58) Field of Classification Search
None
See application file for complete search history.

(56) References Cited

FOREIGN PATENT DOCUMENTS

CN 106660548 5/2017
JP 2001-032863 2/2001
(Continued)

OTHER PUBLICATIONS

Extended European Search Report for European Patent Application No. 19837655.0 dated Jul. 23, 2021.
(Continued)

*Primary Examiner* — Timothy Hannon
(74) *Attorney, Agent, or Firm* — Amin, Turocy & Watson, LLP (57) ABSTRACT

This clutch control device includes an engine (13), a transmission (21), a clutch device (26) configured to connect and disconnect motive power transmission between the engine (13) and the transmission (21), a clutch actuator (50) configured to drive the clutch device (26) and change a clutch capacity, and a control unit (60) configured to calculate a target value (Pt) of a control parameter (Ps) for the clutch capacity. When the target value (Pt) of the control parameter (Ps) immediately after system startup is defined as a first control target value (P1) and the target value (Pt) of the control parameter (Ps) during a clutch stroke at the time of the system startup is defined as a second control target value (P2), the control unit (60) is configured to set the first control target value (P1) to a value greater than the second control target value (P2).

10 Claims, 8 Drawing Sheets (52) U.S. Cl.
CPC ........... *F16D 2500/7041* (2013.01); *F16D 2500/70406* (2013.01); *F16D 2500/70412* (2013.01)

(56) References Cited

FOREIGN PATENT DOCUMENTS

| JP | 2010-195363 | 9/2010 |
|----|-------------|--------|
| JP | 2011-033095 | 2/2011 |
| JP | 2012-026465 | 2/2012 |
| JP | 2015-051728 | 3/2015 |

OTHER PUBLICATIONS

International Search Report and Written Opinion for International Application No. PCT/JP2019/022509 dated Aug. 13, 2019, 6 pages.

CLUTCH CONTROL DEVICE

TECHNICAL FIELD

The present invention relates to a clutch control device.

The present application claims priority based on Japanese Patent Application No. 2018-135955 filed on Jul. 19, 2018, the contents of which are incorporated herein by reference.

BACKGROUND ART

In recent saddle-ride type vehicles, an automated clutch system for automatically performing connection and disconnection operations of a clutch device according to electrical control has been proposed. In this system, the application of a standby hydraulic pressure for performing ineffective stroke elimination at the time of the disconnection of a clutch to a hydraulically operated clutch device so that the vehicle quickly starts running is conceivable.

Technology for eliminating an ineffective stroke of the starting clutch in a short time by switching a hydraulic pressure command value to an ineffective stroke eliminating pressure higher than a creeping pressure when a hydraulic pressure of a hydraulic circuit rises has been disclosed (for example, see Patent Document 1).

RELATED ART DOCUMENT

Patent Document

Patent Document 1: Japanese Unexamined Patent Application, First Publication No. 2001-032863

SUMMARY

Problems to be Solved by the Invention

Incidentally, the friction of each part when a clutch device is operated changes with an operation state of the clutch device. In particular, when the clutch device, which has been stationary, is operated at the time of system startup and the clutch device is allowed to be stationary again after ineffective stroke elimination, a variation in the start and end of a clutch stroke or the like is easily generated until the clutch device is put in a standby state.

An objective of the present invention is to provide a clutch control device capable of quickly and reliably performing ineffective stroke elimination for a clutch device at the time of system startup.

Means for Solving the Problem

As a solution for solving the above-described problems, aspects of the present invention have the following configurations.

(1) According to an aspect of the present invention, there is provided a clutch control device including: an engine; a transmission; a clutch device configured to connect and disconnect motive power transmission between the engine and the transmission; a clutch actuator configured to drive the clutch device and change a clutch capacity; and a control unit configured to calculate a target value of a control parameter for the clutch capacity, wherein, when the target value of the control parameter immediately after system startup is defined as a first control target value and the target value of the control parameter during a clutch stroke at the time of the system startup is defined as a second control target value, the control unit is configured to set the first control target value to a value greater than the second control target value.

(2) The clutch control device according to the above-described (1) further includes a control parameter sensor configured to detect an actually measured value of the control parameter, wherein, when the control parameter detected by the control parameter sensor has reached the first control target value at the time of the system startup, the control unit may be configured to switch the target value of the control parameter from the first control target value to the second control target value.

(3) In the clutch control device according to the above-described (1) or (2), after the target value of the control parameter is switched to the second control target value, the control unit may be configured to switch the target value of the control parameter to a third control target value smaller than the second control target value when the stroke of the clutch device has been stopped.

(4) In the clutch control device according to the above-described (3), the control unit may be configured to switch the target value of the control parameter to the third control target value after the second control target value is continued for a predetermined specified time period.

(5) In the clutch control device according to the above-described (3) or (4), when the target value of the control parameter is switched from the second control target value to the third control target value, the control unit may be configured to set a change speed of the target value of the control parameter to a speed lower than or equal to a predetermined target speed.

Advantage of the Invention

According to the clutch control device described in the above-described (1) of the present invention, the clutch device and the clutch actuator, which have been stationary, can be quickly operated against various frictions according to a relatively large first control target value at the time of system startup. Thereby, it is possible to restrict a variation in the stroke start of the clutch device that has been stationary and to quickly and reliably perform ineffective stroke elimination for the clutch device (the cancellation of a backlash or operating reaction force of each part, the application of a preload to a hydraulic path, or the like).

Also, because the friction between the clutch device and the clutch actuator is reduced after the stroke of the clutch device is started, the stroke of the clutch device can easily converge according to the relatively small second control target value.

According to the clutch control device described in the above-described (2) of the present invention, at the time of the system startup, the clutch device and the clutch actuator, which have been stationary, are quickly operated according to the relatively large first control target value and the stroke of the clutch device can be reliably performed. Also, after the actually measured value of the control parameter reaches the first control target value (after the stroke of the clutch device is started), the stroke of the clutch device can easily converge by the control target value being switched to the relatively small second control target value.

According to the clutch control device described in the above-described (3) of the present invention, it is possible to maintain a stroke stop state by effectively utilizing the friction of the clutch device that has been stationary when the stroke of the clutch device has been stopped after the clutch device was allowed to stroke and ineffective stroke elimination was performed after the system startup. Also, in the stroke stop state, the target value of the control parameter of the clutch device is switched to the relatively small third control target value, so that the power consumption of the clutch actuator can be restricted.

According to the clutch control device described in the above-described (4) of the present invention, it is possible to secure a stroke time period of the clutch device and reliably perform ineffective stroke elimination for the clutch device by continuing the second control target value for a specified time period.

According to the clutch control device described in the above-described (5) of the present invention, when the target value of the control parameter is switched from the second control target value to the third control target value, a change speed of the target value of the control parameter is restricted to a predetermined value or less, so that it is possible to maintain a stroke stop state by effectively utilizing the friction of the clutch device that has been stationary and restrict the power consumption of the clutch actuator.

DESCRIPTION OF THE EMBODIMENTS

Hereinafter, embodiments of the present invention will be described with reference to the drawings. Also, in the following description, forward, rearward, left, and right directions and the like are the same as those in a vehicle to be described below unless otherwise mentioned. Also, an arrow FR indicating a forward direction with respect to the vehicle, an arrow LH indicating a left direction with respect to the vehicle, and an arrow UP indicating an upward direction with respect to the vehicle are shown in appropriate places in drawings used in the following description.
<Whole Vehicle>

Figure 1:
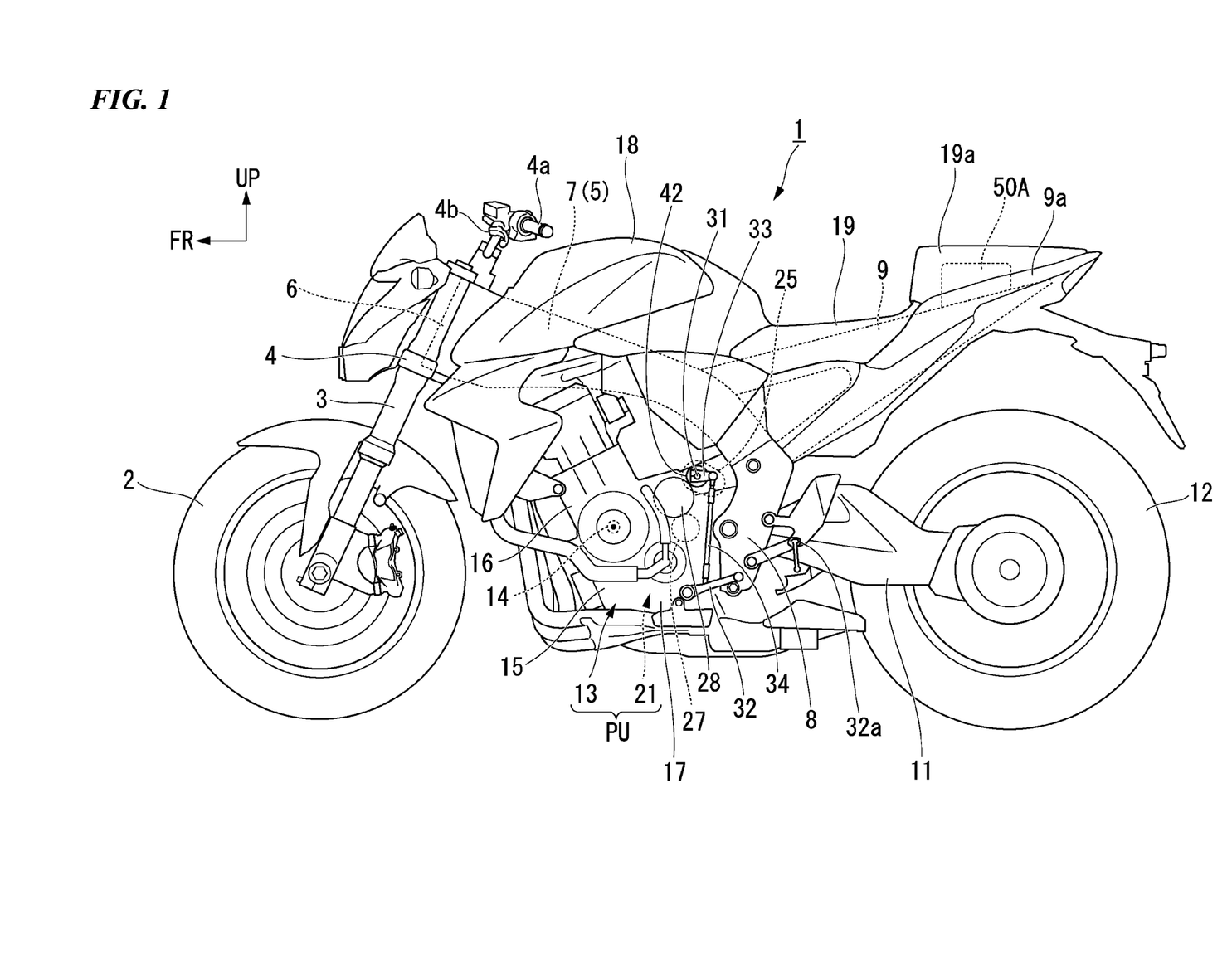
FIG. 1 is a left side view of a motorcycle according to an embodiment of the present invention.

As illustrated in FIG. 1, the present embodiment is applied to a motorcycle 1 that is an example of a saddle-ride type vehicle. A front wheel 2 of the motorcycle 1 is supported by lower ends of one pair of left and right front forks 3. Upper parts of the left and right front forks 3 are supported by a head pipe 6 of a front end of a vehicle body frame 5 via a steering stem 4. A bar-type steering handle 4a is mounted on a top bridge of the steering stem 4.

The vehicle body frame 5 includes the head pipe 6, main tubes 7 that extend downward and rearward from the head pipe 6 at the center in a vehicle width direction (a left/right direction), left and right pivot frames 8 connected in the downward direction of a rear end of the main tubes 7 and a seat frame 9 connected in the rearward direction of the main tubes 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

In the upward direction of the left and right main tubes 7, a fuel tank 18 is supported. In the upward direction of the seat frame 9 in the rearward direction of the fuel tank 18, a front seat 19 and a rear seat cover 19a are aligned in front of and behind each other and supported. The periphery of the seat frame 9 is covered with a rear cowl 9a. In the downward direction of the left and right main tubes 7, a power unit PU that is a motor of the motorcycle 1 is suspended. The power unit PU is linked with the rear wheel 12, for example, via a chain-type transmission mechanism.

The power unit PU integrally includes an engine (an internal combustion engine and a motor) 13 positioned on a front side of the power unit PU and a transmission 21 positioned on a rear side of the power unit PU. The engine 13, for example, is a multiple cylinder engine in which a rotary shaft of a crank shaft 14 is aligned in the left/right direction (the vehicle width direction). The engine 13 raises a cylinder 16 above a front part of a crank case 15. A rear part of the crank case 15 is formed as a transmission case 17 that accommodates the transmission 21.
<Transmission>

Figure 2:
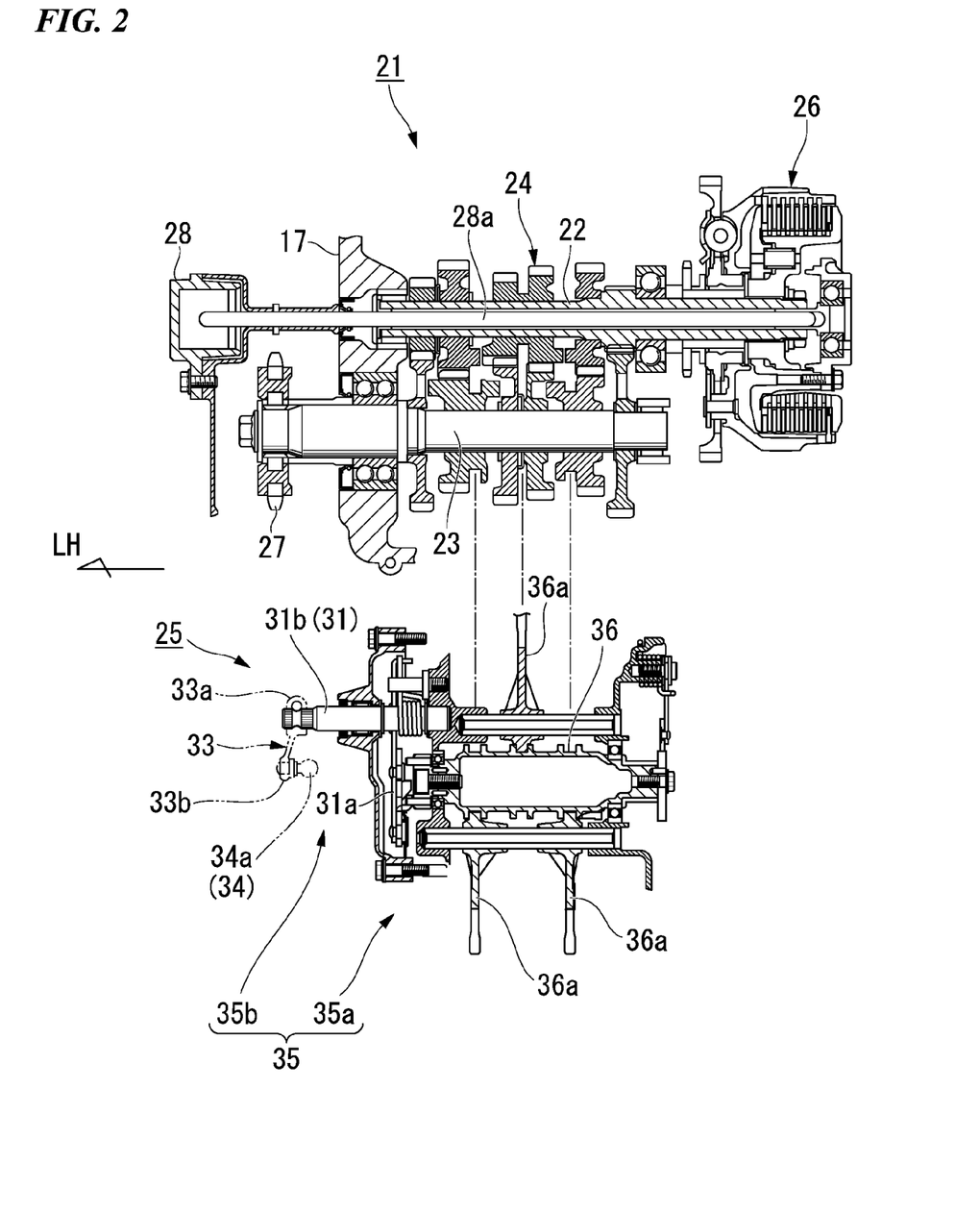
FIG. 2 is a cross-sectional view of a transmission and a change mechanism of the above-described motorcycle.

As illustrated in FIG. 2, the transmission 21 is a stepped transmission including a main shaft 22, a counter shaft 23, and a transmission gear group 24 disposed across both shafts 22 and 23. The counter shaft 23 constitutes an output shaft of the transmission 21 and the power unit PU. An end of the counter shaft 23 protrudes to the left side of a rear part of the crank case 15 and is connected to the rear wheel 12 via the chain-type transmission mechanism.

The transmission gear group 24 includes gears corresponding to the number of shift stages supported at both shafts 22 and 23. The transmission 21 is of a constant engagement type in which a pair of corresponding gears of the transmission gear group 24 are constantly engaged with each other between the shafts 22 and 23. A plurality of gears supported at both shafts 22 and 23 can be classified into a free gear that can rotate with respect to a corresponding shaft and a slide gear (a shifter) that is spline-fitted to a corresponding shaft. One of the free gear and the slide gear has a convex dog provided in an axial direction and the other has a concave slot provided in the axial direction so that the slot is engaged with the dog. That is, the transmission 21 is a so-called dog mission.

The main shaft 22 and the counter shaft 23 of the transmission 21 are disposed to be aligned in front of and behind each other in the rearward direction of the crank shaft 14. A clutch device 26 operated by a clutch actuator 50 (see FIG. 3) is coaxially disposed at a right end of the main shaft 22. The clutch device 26, for example, is a wet multiplate clutch and is a so-called normal open clutch. That is, the clutch device 26 reaches a connected state in which motive power transmission is enabled in accordance with the supply of a hydraulic pressure from the clutch actuator 50 and is returned to a disconnected state in which motive power transmission is disabled when there is no supply of the hydraulic pressure from the clutch actuator 50.

Rotation power of the crank shaft 14 is transmitted to the main shaft 22 via the clutch device 26 and is transmitted from the main shaft 22 to the counter shaft 23 via any gear pair of the transmission gear group 24. A drive sprocket 27 of the above-described chain-type transmission mechanism is attached to a left end of the counter shaft 23 that protrudes to the left side of a rear part of the crank case 15.

In the rearward and downward directions of the transmission 21, a change mechanism 25, which performs switching between gear pairs of the transmission gear group 24, is accommodated. The change mechanism 25 operates a plurality of shift forks 36a in accordance with the pattern of a lead groove formed on the outer periphery thereof in accordance with rotation of a shift drum 36 having a hollow cylindrical shape parallel to both shafts 22 and 23 and performs switching of a gear pair for use in motive power transmission between the shafts 22 and 23 in the transmission gear group 24.

The change mechanism 25 includes a shift spindle 31 parallel to the shift drum 36. At the time of rotation of the shift spindle 31, a shift arm 31a fixed to the shift spindle 31 rotates the shift drum 36, rotates the shift fork 36a in the axial direction in accordance with the pattern of the lead groove, and switches a gear pair in which motive power transmission is enabled within the transmission gear group 24 (i.e., switches a shift stage).

Referring also to FIG. 1, the shift spindle 31 causes a shaft outer part 31b to protrude to an outward side (in the left direction) of the crank case 15 in the vehicle width direction such that the change mechanism 25 is operable. A shift load sensor 42 (a shift operation detecting means) is coaxially attached to the shaft outer part 31b of the shift spindle 31. A swing lever 33 is attached to the shaft outer part 31b (or a rotation shaft of the shift load sensor 42) of the shift spindle 31. The swing lever 33 extends rearward from a base end part 33a that is fixed to the shift spindle 31 (or the rotation shaft) through clamp fixing and an upper end of a link load 34 is connected to a tip end part 33b thereof via an upper ball joint 34a so that it is freely swingable. A lower end of the link load 34 is connected to a shift pedal 32 that is operated by a driver using a foot via a lower ball joint (not illustrated) so that it is freely swingable.

As illustrated in FIG. 1, the shift pedal 32 has a front end supported at a lower part of the crank case 15 so that the shift pedal 32 is vertically swingable via a shaft in a left/right direction. A pedal part for hooking the driver's tiptoe placed on a step 32a is provided at a rear end of the shift pedal 32 and a lower end of the link load 34 is connected to a middle part in a front/back direction of the shift pedal 32.

As illustrated in FIG. 2, a shift change device 35, which includes the shift pedal 32, the link load 34, and the change mechanism 25 and performs gear switching of a gar shift step of the transmission 21, is configured. In the shift change device 35, an assembly (the shift drum 36, the shift forks 36a, and the like), which switches a shift stage of the transmission 21 inside the transmission case 17, will be referred to as a shift operating unit 35a and an assembly (the shift spindle 31, the shift arm 31a, and the like) that rotates around the shift spindle 31 when a shift operation for the shift pedal 32 is input and transmits this rotation to the shift operating unit 35a will be referred to as a shift operation receiving unit 35b.

Here, the motorcycle 1 employs a so-called semi-automated transmission system (an automated clutch-type transmission system) in which only a shift operation of the transmission 21 (a foot operation of the shift pedal 32) is performed by the driver and connection and disconnection operations of the clutch device 26 are automatically performed by electrical control in accordance with an operation of the shift pedal 32.

<Transmission System>

Figure 4:
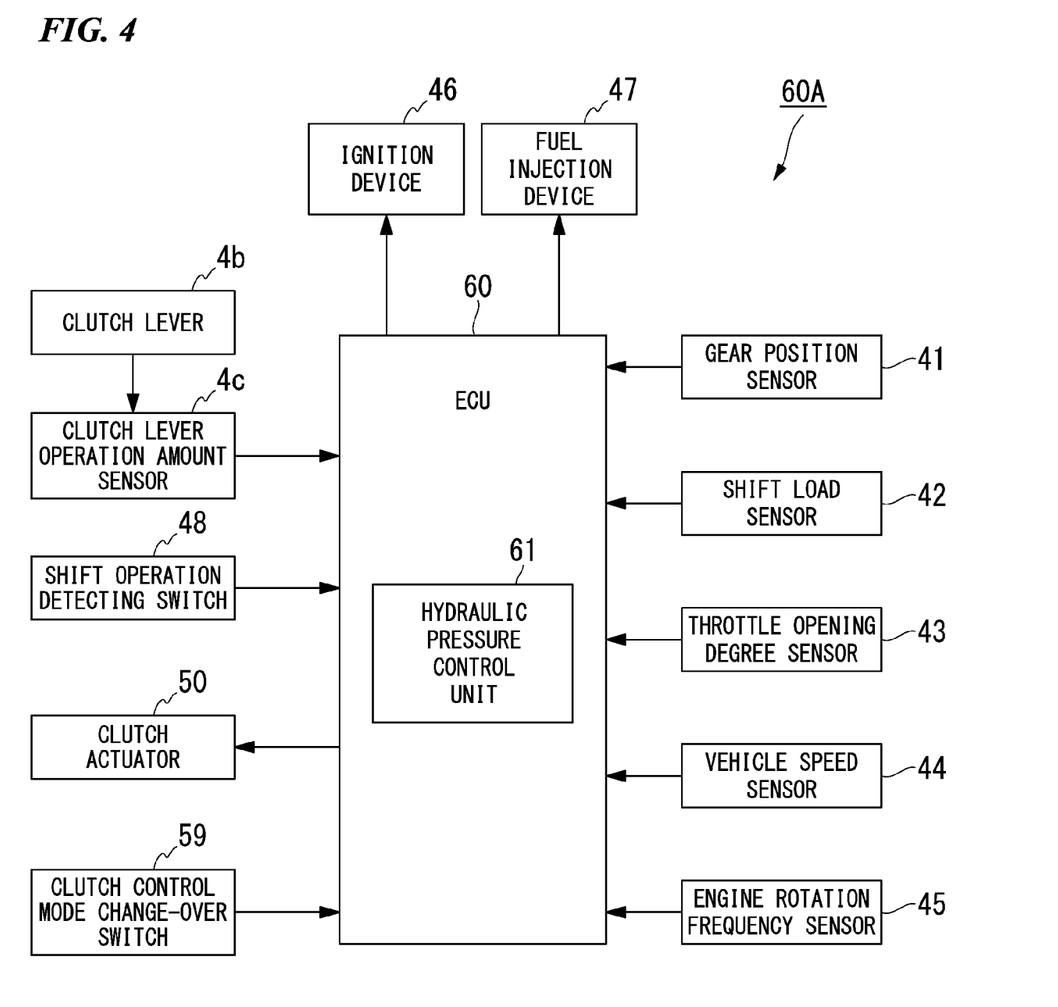
FIG. 4 is a block diagram of a transmission system.

As illustrated in FIG. 4, the above-described transmission system includes a clutch actuator 50, an electronic control unit (ECU) (control unit) 60, and various types of sensors 41 to 45.

The ECU 60 controls the operation of the clutch actuator 50 on the basis of detection information from a gear position sensor 41 that detects a shift stage from a rotation angle of the shift drum 36 and a shift load sensor (for example, a torque sensor) 42 that detects an operation torque input to the shift spindle 31, various types of vehicle state detection information from a throttle opening degree sensor 43, a vehicle speed sensor 44, and an engine rotational speed sensor 45, and the like and controls operations of an ignition device 46 and a fuel injection device 47.

Detection information from hydraulic pressure sensors 57 and 58 and a shift operation detecting switch (a shift neutral switch) 48 to be described below is also input to the ECU 60.

Also, the ECU 60 includes a hydraulic pressure control unit (a clutch control unit) 61 and a function thereof will be described below. In FIG. 4, a reference sign 60A denotes the clutch control device of the present embodiment.

Figure 3:
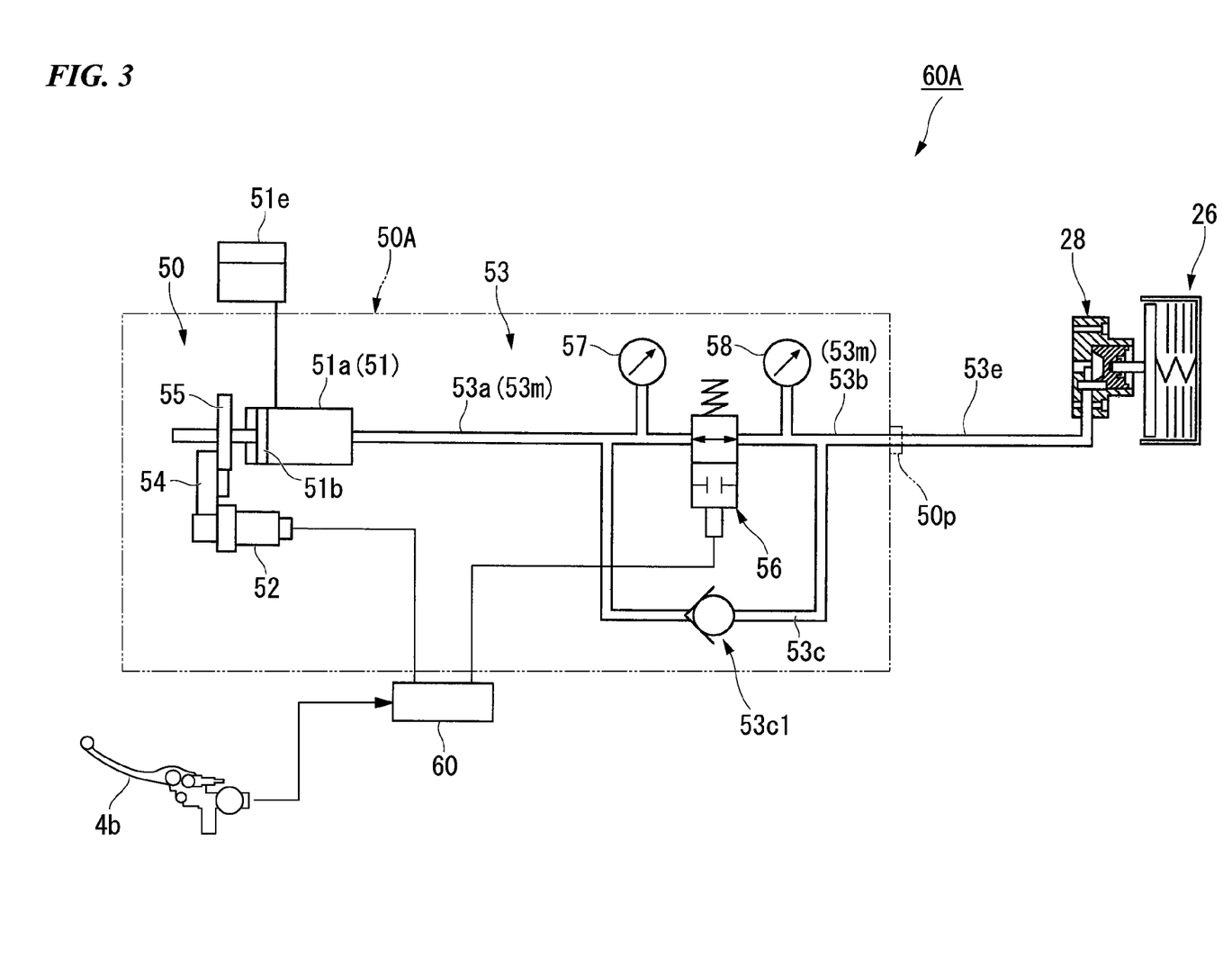
FIG. 3 is a schematic explanatory view of a clutch operating system including a clutch actuator.

Referring also to FIG. 3, the clutch actuator 50 can control a liquid pressure for connecting and disconnecting the clutch device 26 according to operation control by the ECU 60. The clutch actuator 50 includes an electric motor 52 (hereinafter simply referred to as a motor 52) serving as a drive source and a master cylinder 51 driven by the motor 52. The clutch actuator 50 constitutes an integrated clutch control unit 50A together with the hydraulic pressure circuit device 53 provided between the master cylinder 51 and a hydraulic pressure supply-discharge port 50p.

The ECU 60 calculates a target value of a hydraulic pressure (a target hydraulic pressure) supplied to a slave cylinder 28 for connecting and disconnecting the clutch device 26 on the basis of a preset calculation program and controls the clutch control unit 50A such that a hydraulic pressure (a slave hydraulic pressure) of the slave cylinder 28 side detected by a downstream-side hydraulic pressure sensor (a control parameter sensor) 58 is close to the target hydraulic pressure.

The master cylinder 51 causes a piston 51b inside a cylinder main body 51a to perform a stroke in accordance with driving of the motor 52 and enables operating oil inside the cylinder main body 51a to be supplied and discharged with respect to the slave cylinder 28. In FIG. 3, a reference sign 55 denotes a conversion mechanism serving as a ball screw mechanism, a reference sign 54 denotes a transmission mechanism disposed across the motor 52 and the conversion mechanism 55, and a reference sign 51e denotes a reservoir connected to the master cylinder 51.

The hydraulic pressure circuit device 53 includes a valve mechanism (a solenoid valve 56) for opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic pressure circuit device 53 can be divided into an upstream-side oil path 53a that is on the master cylinder 51 side from the solenoid valve 56 and a downstream-side oil path 53b that is on the slave cylinder 28 side from the solenoid valve 56. The hydraulic pressure circuit device 53 further includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 for causing operating oil to flow in only one way from the upstream side to the downstream side is provided on the bypass oil path 53c. On the upstream side of the solenoid valve 56, an upstream-side hydraulic pressure sensor 57 for detecting a hydraulic pressure of the upstream-side oil path 53a is provided. On the downstream side of the solenoid valve 56, a downstream-side hydraulic pressure sensor 58 for detecting a hydraulic pressure of the downstream-side oil path 53b is provided.

As illustrated in FIG. 1, for example, the clutch control unit 50A is accommodated in the rear cowl 9a. The slave cylinder 28 is attached to the left side of the rear part of the crank case 15. The clutch control unit 50A and the slave cylinder 28 are connected via a hydraulic piping 53e (see FIG. 3).

As illustrated in FIG. 2, the slave cylinder 28 is coaxially disposed in the left direction of the main shaft 22. When a hydraulic pressure is supplied from the clutch actuator 50, the slave cylinder 28 presses a push load 28a passing through the inside of the main shaft 22 in the right direction. By pressing the push load 28a in the right direction, the slave cylinder 28 causes the clutch device 26 to operate in a connected state via the push load 28a. When there is no supply of the hydraulic pressure, the slave cylinder 28 releases the pressing of the push load 28a and returns the clutch device 26 to a disconnected state.

In order to maintain the clutch device 26 in the connected state, it is necessary to continue the supply of the hydraulic pressure and electric power is consumed to that extent. Therefore, as illustrated in FIG. 3, the solenoid valve 56 is provided in the hydraulic pressure circuit device 53 of the clutch control unit 50A and the solenoid valve 56 is closed after the supply of the hydraulic pressure to the clutch device 26 side. Thereby, the hydraulic pressure supplied to the clutch device 26 side is maintained and a hydraulic pressure corresponding to a decrease in the pressure is configured to be supplemented (recharged by an amount corresponding to a leak), so that the energy consumption is inhibited.

<Clutch Control>

Figure 5:
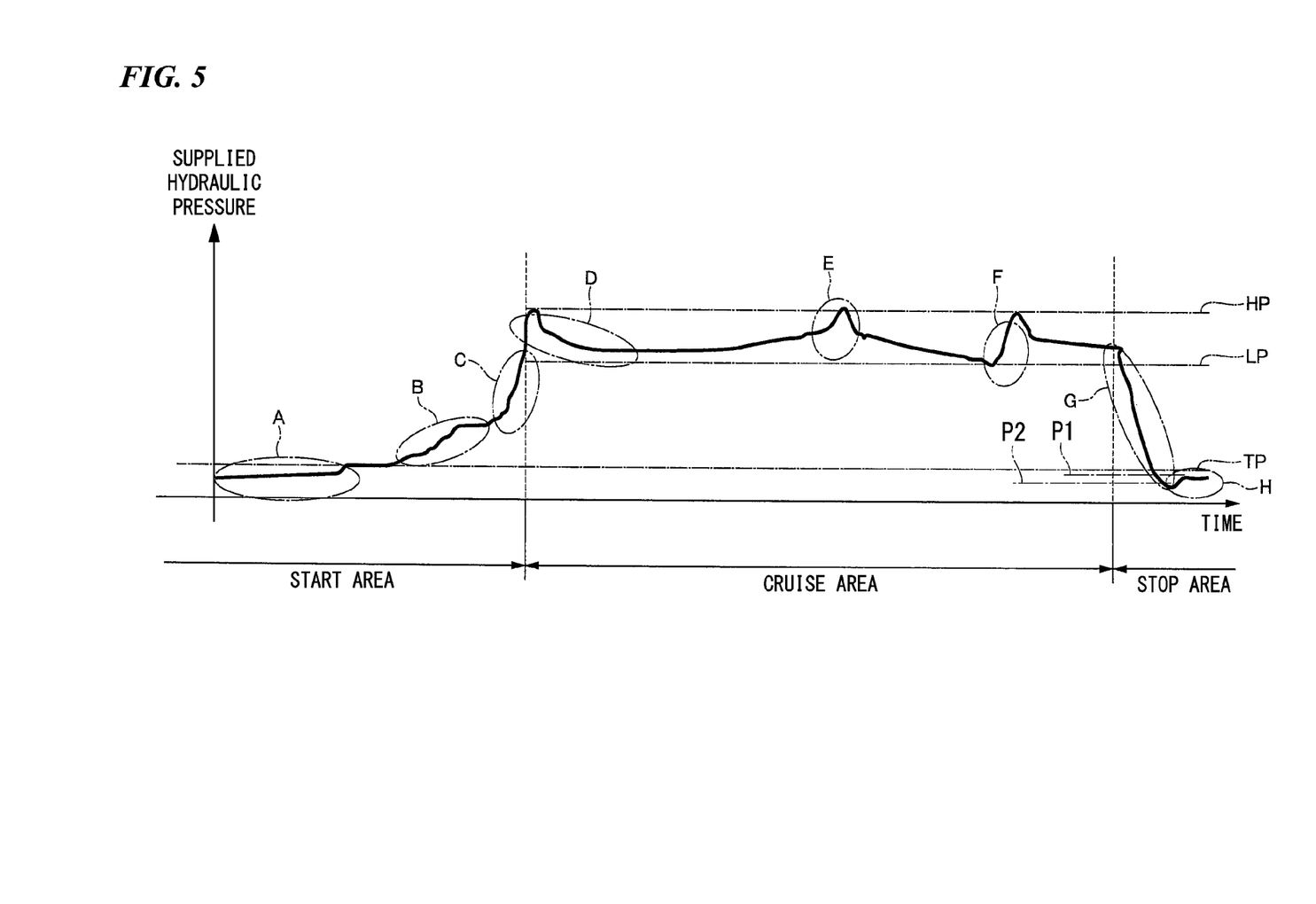
FIG. 5 is a graph illustrating a change in a supplied hydraulic pressure of the clutch actuator.

Next, an action of the clutch control system will be described with reference to a graph of FIG. 5. In the graph of FIG. 5, the vertical axis represents a supplied hydraulic pressure detected by the downstream-side hydraulic pressure sensor 58 and the horizontal axis represents elapsed time.

At the time of stopping (idling) of the motorcycle 1, both the motor 52 and the solenoid valve 56 controlled by the ECU 60 are in a state in which the supply of electric power has been blocked. That is, the motor 52 is in a stop state and the solenoid valve 56 is in a valve open state. At this time, the slave cylinder 28 side (the downstream side) is in a low-pressure state having a pressure lower than a touch point hydraulic pressure TP and the clutch device 26 is in a non-fastened state (a disconnected state or a released state). This state corresponds to an area A of FIG. 5.

When the motorcycle 1 is started, electric power is supplied only to the motor 52, and a hydraulic pressure is supplied from the master cylinder 51 to the slave cylinder 28 through the solenoid valve 56 of the valve open state if the rotational speed of the engine 13 is increased. When the hydraulic pressure of the slave cylinder 28 side (the downstream side) is increased to the touch point hydraulic pressure TP or higher, the fastening of the clutch device 26 is started and the clutch device 26 enters a half-clutch state in which partial motive power can be transmitted. Thereby, the motorcycle 1 can be smoothly started. This state corresponds to an area B of FIG. 5.

Thereafter, when a difference between input rotation and output rotation of the clutch device 26 decreases and the hydraulic pressure of the slave cylinder 28 side (the downstream side) reaches a lower limit retaining hydraulic pressure LP, the fastening of the clutch device 26 transitions to a locked state and all the driving force of the engine 13 is transmitted to the transmission 21. This state corresponds to an area C of FIG. 5. The areas A to C form a start area.

When a hydraulic pressure is supplied from the master cylinder 51 side to the slave cylinder 28 side, the solenoid valve 56 is in the valve open state, the motor 52 is driven to rotate in a normal direction according to the application of an electric current to the motor 52, and the master cylinder 51 is pressed. Thereby, the hydraulic pressure of the slave cylinder 28 side is adjusted to a clutch fastening hydraulic pressure. At this time, the driving of the clutch actuator 50 is subjected to feedback control on the basis of a hydraulic pressure detected by the downstream-side hydraulic pressure sensor 58.

Then, when the hydraulic pressure of the slave cylinder 28 side (the downstream side) reaches an upper limit retaining hydraulic pressure HP, electric power is supplied to the solenoid valve 56, the solenoid valve 56 performs a valve closing operation, the supply of electric power to the motor 52 is stopped, and the generation of the hydraulic pressure is stopped. That is, the upstream side enters a low pressure state in accordance with the release of the hydraulic pressure, whereas the downstream side is maintained in the high pressure state (the upper limit retaining hydraulic pressure HP). Thereby, without the master cylinder 51 generating a hydraulic pressure, the clutch device 26 is maintained in the fastened state, and the power consumption can be inhibited while running of the motorcycle 1 is enabled.

Here, a shift may also be performed immediately after a hydraulic pressure is filled in the clutch device 26 according to a shift operation. In this case, before the solenoid valve 56 performs a valve closing operation and causes the upstream side to enter a low pressure state, the motor 52 is reversely driven in a valve open state of the solenoid valve 56 and depressurizes the master cylinder 51 and communicates with the reservoir 51e to relieve hydraulic pressure of the clutch device 26 side to the master cylinder 51 side. At this time, the driving of the clutch actuator 50 is subjected to feedback control on the basis of a hydraulic pressure detected by the upstream-side hydraulic pressure sensor 57.

Even if the solenoid valve 56 is closed and the clutch device 26 is maintained in the fastened state, the hydraulic pressure of the downstream side gradually decreases (leaks) as in an area D of FIG. 5. That is, the hydraulic pressure of the downstream side gradually decreases due to primary causes such as a leakage of the hydraulic pressure and a temperature decrease according to deformation and the like of seals of the solenoid valve 56 and the one-way valve 53c1.

On the other hand, as in the area E of FIG. 5, a hydraulic pressure of the downstream side may also be increased due to an increase in the temperature or the like. Because any small change in the hydraulic pressure of the downstream side can be absorbed by an accumulator (not illustrated) and the motor 52 and the solenoid valve 56 are operated every time the hydraulic pressure changes, power consumption is not increased.

As in an area E of FIG. 5, when a hydraulic pressure of the downstream side has increased to the upper limit retaining hydraulic pressure HP, the solenoid valve 56 is set in a valve open state in a stepwise manner due to a decrease in the supply of electric power to the solenoid valve 56 or the like and the hydraulic pressure of the downstream side is relieved toward the upstream side.

As in an area F of FIG. 5, when the hydraulic pressure of the downstream side has decreased to the lower limit retaining hydraulic pressure LP, the supply of electric power to the motor 52 is started in a state in which the solenoid valve 56 has been closed and the hydraulic pressure of the upstream side is increased. When the hydraulic pressure of the upstream side is higher than the hydraulic pressure of the downstream side, this hydraulic pressure is supplied (recharged) to the downstream side via the bypass oil path 53c and the one-way valve 53c1. When the hydraulic pressure of the downstream side becomes the upper limit retaining hydraulic pressure HP, the supply of electric power to the motor 52 is stopped and the generation of the hydraulic pressure is stopped. Thereby, the hydraulic pressure of the downstream side is maintained between the upper limit retaining hydraulic pressure HP and the lower limit retaining hydraulic pressure LP and the clutch device 26 is maintained in the fastened state. The areas D to F are set as a cruise area.

If the transmission 21 becomes neutral when the motorcycle 1 is stopped, the supply of electric power to the motor 52 and the solenoid valve 56 is stopped together. Thereby, the master cylinder 51 stops the generation of a hydraulic pressure and stops the supply of a hydraulic pressure to the slave cylinder 28. The solenoid valve 56 is in a valve open state and the hydraulic pressure within the downstream-side oil path 53b is returned to the reservoir 51e. According to the above, the slave cylinder 28 side (the downstream side) is in a low pressure state with a hydraulic pressure lower than the touch point hydraulic pressure TP and the clutch device 26 is in a non-fastened state. This state corresponds to areas G and H of FIG. 5. The areas G and H are set as a stop area.

On the other hand, if the transmission 21 remains in an in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP at which the connection of the clutch device 26 starts and is a hydraulic pressure (a hydraulic pressure applied to the areas A and H of FIG. 5) at which the clutch device 26 is not connected. In accordance with the application of the standby hydraulic pressure WP, ineffective stroke elimination for the clutch device 26 (the cancellation of a backlash or operating reaction force of each part, the application of a preload to a hydraulic path, or the like) can be performed and operation responsiveness at the time of the connection of the clutch device 26 is improved.

<Shift Control>

Next, shift control of the motorcycle 1 will be described.

In an in-gear stop state in which a gear position of the transmission 21 is in an in-gear state of the first speed and a vehicle speed is lower than a setting value corresponding to stopping, the motorcycle 1 according to the present embodiment performs control for decreasing the standby hydraulic pressure WP supplied to the slave cylinder 28 when a shift operation on the shift pedal 32 from the first speed to neutral is performed.

Here, when the motorcycle 1 is in the stop state and the gear position of the transmission 21 is any shift stage position other than neutral, i.e., when the transmission 21 is in the in-gear stop state, the standby hydraulic pressure WP that has been preset is supplied to the slave cylinder 28.

The standby hydraulic pressure WP is set to a first setting value P1 (see FIG. 5) that is a standard standby hydraulic pressure at normal times (in the case of a non-detected state in which a shift operation of the shift pedal 32 is not detected). Thereby, the clutch device 26 is in a standby state in which the ineffective stroke elimination has been performed and the responsiveness at the time of clutch fastening is improved. That is, when the rotational speed of the engine 13 is increased by the driver increasing the degree of throttle opening, the fastening of the clutch device 26 is immediately started in accordance with the supply of a hydraulic pressure to the slave cylinder 28 and quick start and acceleration of the motorcycle 1 can be performed.

The motorcycle 1 includes a shift operation detecting switch 48 in addition to the shift load sensor 42 so that the driver's shift operation on the shift pedal 32 is detected. For example, the shift operation detecting switch 48 is disposed opposite to the tip end of the shift arm 31a and detects a slight rotation of the shift spindle 31 by the shift operation of the shift pedal 32 with high sensitivity.

In the in-gear stop state, when the shift operation detecting switch 48 detects a shift operation from the first speed to neutral, the hydraulic pressure control unit 61 performs control for setting the standby hydraulic pressure WP to a second setting value P2 (a low standby hydraulic pressure; see FIG. 5) lower than the first setting value P1 before the shift operation.

When the transmission 21 is in the in-gear state, the standard standby hydraulic pressure corresponding to the first setting value P1 is supplied to the slave cylinder 28 at normal times, so that so-called dragging is slightly generated in the clutch device 26. At this time, a dog and a slot (a dog hole) engaged with each other in the dog clutch of the transmission 21 may press each other in the rotation direction and cause resistance to disengagement and the shift operation may become heavy. In this case, if the standby hydraulic pressure WP supplied to the slave cylinder 28 is decreased to a low standby hydraulic pressure corresponding to the second setting value P2, the engagement between the dog and the slot can be easily released and the shift operation becomes light.

<Clutch Control Mode>

Figure 7:
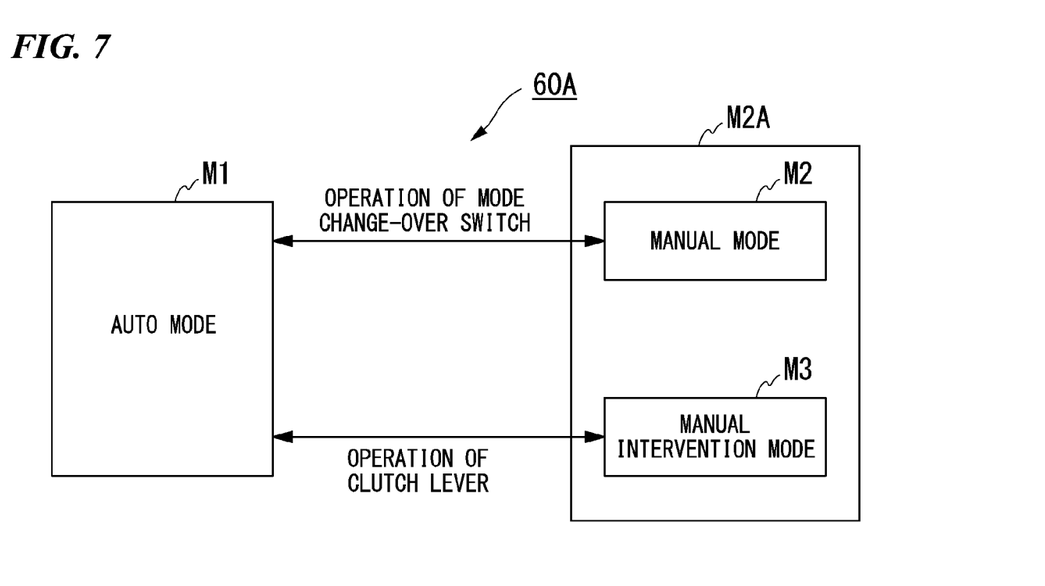
FIG. 7 is an explanatory diagram illustrating the transition of a clutch control mode according to the embodiment of the present invention.

As illustrated in FIG. 7, a clutch control device 60A according to the present embodiment has three types of clutch control modes. The clutch control mode appropriately transitions between three types of modes including an automated mode M1 in which automated control is performed, a manual mode M2 in which a manual operation is performed, and a manual intervention mode M3 in which a temporary manual operation is performed in accordance with operations of a clutch control mode changeover switch 59 (see FIG. 4) and a clutch lever 4b (see FIG. 1). Also, targets including the manual mode M2 and the manual intervention mode M3 will be referred to as a manual system M2A.

The automated mode M1 is a mode in which the clutch device 26 is controlled by calculating a clutch capacity suitable for a traveling state in accordance with automated start/shift control. The manual mode M2 is a mode in which the clutch device 26 is controlled by calculating a clutch capacity in accordance with an occupant's clutch operation instruction. The manual intervention mode M3 is a temporary manual operation mode in which the clutch device 26 is controlled by receiving a clutch operation instruction from the occupant during the automated mode M1 and calculating a clutch capacity from the clutch operation instruction. Also, the manual intervention mode is set such that the mode is returned to the automated mode M1 when the occupant stops (completely releases) the operation on the clutch lever 4b during the manual intervention mode M3.

The clutch control device 60A according to the present embodiment generates a clutch control hydraulic pressure by driving an oil pump (not illustrated) using a rotary driving force of the engine 13. Thus, the clutch control device 60A starts control from a clutch off state (a disconnected state) in the automated mode M1 at the time of system startup. Also, because a clutch operation is unnecessary when the engine 13 is stopped, the clutch control device 60A is set to return to the clutch off state in the automated mode M1.

Basically, in the automated mode M1, clutch control is automatically performed and the motorcycle 1 is enabled to travel without any lever operation. In the automated mode M1, a clutch capacity is controlled according to a degree of throttle opening, an engine speed, a vehicle speed, and a shift sensor output. Thereby, the motorcycle 1 can start without an engine failure (engine stop or engine stall) in only a throttle operation and a shift can be performed in only a shift operation. However, at the time of an extremely low speed corresponding to idling, the clutch device 26 may be automatically disconnected. Also, by gripping the clutch lever 4b in the automated mode M1, the mode is switched to the manual intervention mode M3 and the clutch device 26 can be arbitrarily disconnected.

On the other hand, in the manual mode M2, a clutch capacity is controlled according to a lever operation by the occupant. Switching between the automated mode M1 and the manual mode M2 can be performed by operating the clutch control mode changeover switch 59 (see FIG. 4) while the vehicle is stopped. Also, the clutch control device 60A may include an indicator indicating validity of a lever operation at the time of the transition to the manual system M2A (the manual mode M2 or the manual intervention mode M3).

In the manual mode M2, basically, clutch control is manually performed and a clutch hydraulic pressure can be controlled in accordance with an operation angle of the clutch lever 4b. Thereby, the connection and disconnection of the clutch device 26 can be controlled in accordance with the occupant's intention and the vehicle can also travel by the clutch device 26 being connected at the time of an extremely low speed corresponding to idling. However, an engine failure may be caused due to a lever operation and automatic starting in only a throttle operation cannot be performed. Also, clutch control is automatically performed through intervention at the time of a shift operation in the manual mode M2.

Although the connection and disconnection of the clutch device 26 are automatically performed by the clutch actuator 50 in the automated mode M1, a manual operation can be temporarily performed through intervention in the automated control of the clutch device 26 when a manual clutch operation is performed on the clutch lever 4b (the manual intervention mode M3).

Figure 6:
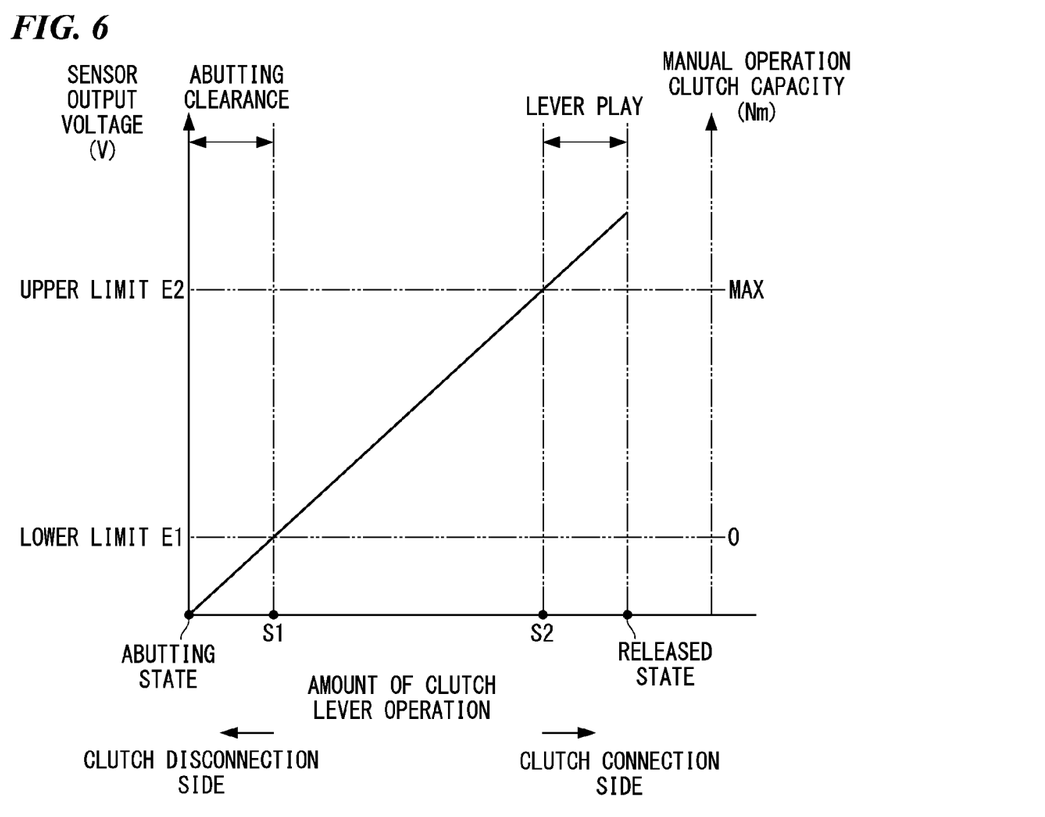
FIG. 6 is a graph illustrating correlations between an amount of clutch lever operation, a sensor output voltage, and a clutch capacity according to the embodiment of the present invention.

As illustrated in FIG. 6, an amount of operation (a rotation angle) of the clutch lever 4b and an output value of a clutch lever operation amount sensor (a clutch operation amount sensor) 4c are in a mutually proportional relation (a correlation). The ECU 60 calculates a target hydraulic pressure of the clutch device 26 on the basis of an output value of the clutch lever operation amount sensor 4c. An actual hydraulic pressure (a slave hydraulic pressure) generated in the slave cylinder 28 follows a target hydraulic pressure delayed by the pressure loss.

<Manual Clutch Operation>

As illustrated in FIG. 1, the clutch lever 4b serving as a manual clutch operating element is attached to a base side (an inner side in the vehicle width direction) of the left grip of the steering handle 4a. The clutch lever 4b has no mechanical connection with the clutch device 26 using a cable, a hydraulic pressure, or the like and functions as an operating element for transmitting a clutch operation request signal to the ECU 60. That is, the motorcycle 1 employs a clutch-by-wire system in which the clutch lever 4b and the clutch device 26 are electrically connected to each other.

Referring also to FIG. 4, the clutch lever operation amount sensor 4c, which detects the amount of operation (the rotation angle) of the clutch lever 4b, is integrally provided in the clutch lever 4b. The clutch lever operation amount sensor 4c converts the amount of operation of the clutch lever 4b into an electrical signal and outputs the electrical signal. In a state in which the operation of the clutch lever 4b is valid (the manual system M2A), the ECU 60 drives the clutch actuator 50 on the basis of an output of the clutch lever operation amount sensor 4c. Also, the clutch lever 4b and the clutch lever operation amount sensor 4c may be formed as an integrated body or separate bodies.

The motorcycle 1 includes the clutch control mode changeover switch 59 that switches between control modes of a clutch operation. The clutch control mode changeover switch 59 can arbitrarily perform switching between the automated mode M1 in which clutch control is automatically performed under a predetermined condition and the manual mode M2 in which clutch control is manually performed in accordance with an operation of the clutch lever 4b. For example, the clutch control mode changeover switch 59 is provided in a handle switch attached to the steering handle 4a. Thereby, the occupant can easily operate the clutch control mode changeover switch 59 at the time of normal driving.

Referring also to FIG. 6, the clutch lever 4b can rotate between a released state in which the clutch lever 4b rotates to a clutch connection side when the clutch lever 4b is released without being gripped by the occupant and an abutting state in which the clutch lever 4b rotates to a grip side (a clutch disconnection side) and abuts against the grip in accordance with the gripping of the occupant. When the gripping operation of the occupant is released, the clutch lever 4b is biased to return to the released state that is an initial position.

For example, the clutch lever operation amount sensor 4c may be configured such that an output voltage is set to zero in a state in which the clutch lever 4b is completely gripped (the abutting state) and the output voltage is increased in accordance with a release operation (an operation toward the clutch connection side) of the clutch lever 4b from that state. In the present embodiment, a range in which a voltage for a lever play part present at the start of the gripping of the clutch lever 4b and a voltage for an abutting clearance for securing a gap of a degree at which a finger enters between the gripped lever and the grip among output voltages of the clutch lever operation amount sensor 4c are excluded is set to a range of valid voltages (a valid operation range of the clutch lever 4b).

Specifically, a range between an amount of operation S1 when the clutch lever 4b is released by an amount corresponding to the abutting clearance from the state in which the clutch lever 4b abuts and an amount of operation S2 when the clutch lever 4b is released until an amount corresponding to the lever play part starts is set in correspondence with a range from a lower limit value E1 to an upper limit value E2 of the valid voltage. This range from the lower limit value E1 to the upper limit value E2 corresponds to a range from zero to MAX of the calculated value of a manually operated clutch capacity in a proportional relation. Thereby, influences of a mechanical backlash, a sensor variation, and the like are reduced and the reliability of the amount of driving of the clutch requested by a manual operation can be improved. Also, the voltage at the time of the amount of operation S1 of the clutch lever 4b may be set as the upper limit value E2 of the valid voltage and the voltage at the time of the amount of operation S2 may be set as the lower limit value E1.

<Switching of Feedback Control>

Figure 8:
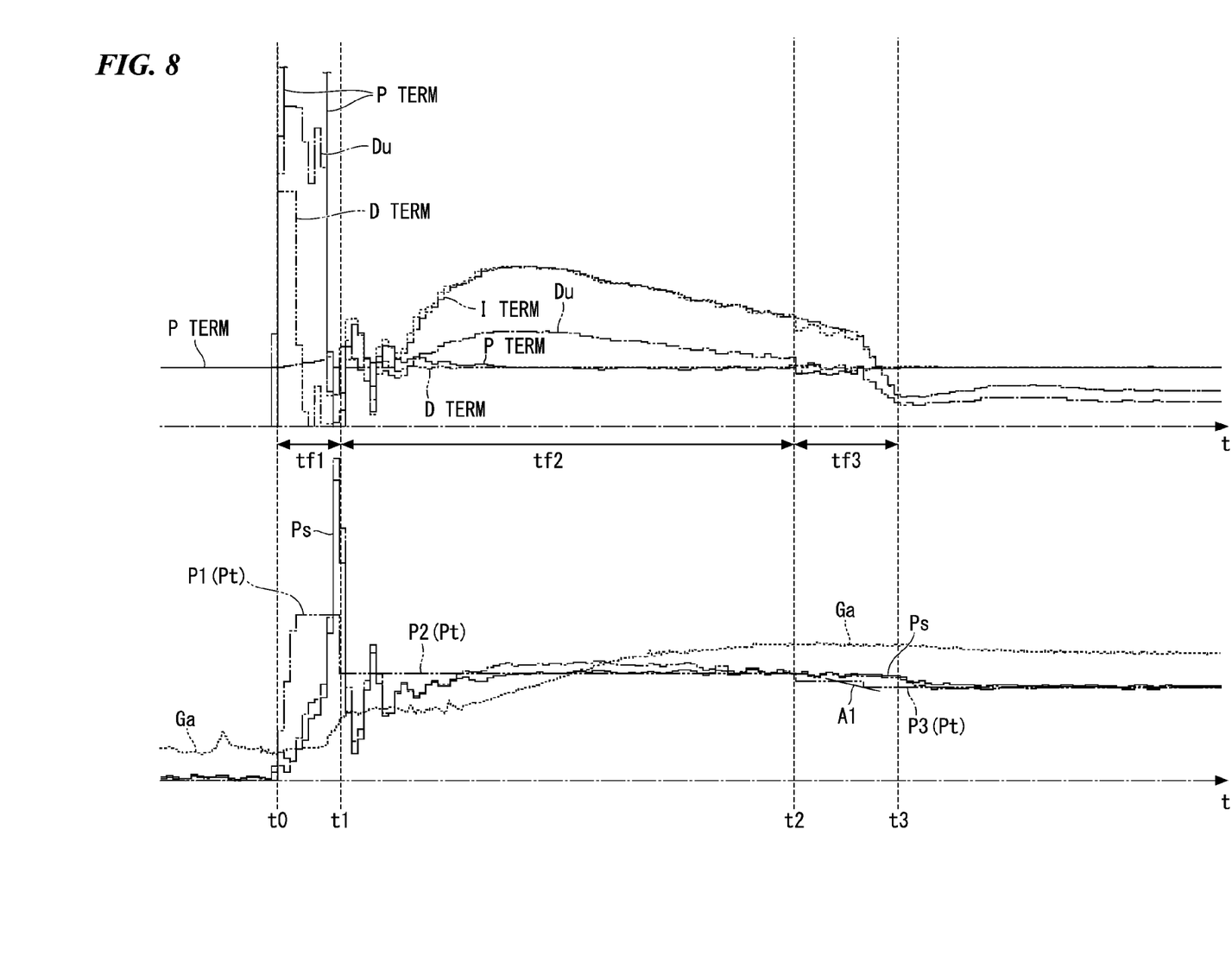
FIG. 8 is a time chart illustrating changes over time in control parameters in the clutch control device according to the embodiment of the present invention.

Referring to FIG. 8, the clutch control device 60A according to the present embodiment performs feedback control (proportional-integral-differential (PID) control) of the clutch actuator 50 so that an actual control parameter (a slave hydraulic pressure) is made close to the control target value (a target hydraulic pressure) of the clutch capacity. The clutch control device 60A switches a feedback control method in accordance with the state of the clutch device 26 at the time of system startup.

A control phase at the time of system startup is switched in the order of a startup phase, a stroke phase, and a standby transition phase and subsequently switched to a start standby phase corresponding to the standby state. In FIG. 8, a line Pt represents a target hydraulic pressure, a line Ps represents a slave hydraulic pressure, a line Du represents a duty ratio (which corresponds to an amount of electric power supplied to the clutch actuator 50), and a line Ga represents a gap (which corresponds to an amount of stroke of the clutch device 26).

The ECU 60 causes the slave hydraulic pressure Ps to quickly respond to the high target hydraulic pressure Pt by setting a duty ratio of main terms which are a P term and a D term in the startup phase at the time of system startup. The target hydraulic pressure Pt of the startup phase is set to be higher than the target hydraulic pressure Pt in operation (in stroke). When the clutch device 26 is in a stationary state (a pre-operation state), friction acting on the inside of the clutch device 26 and the clutch actuator 50 is static friction and is greater than friction (dynamic friction) when the clutch device 26 is in stroke (in operation). Thus, in the startup phase, a relatively large target hydraulic pressure Pt (hereinafter referred to as a first target hydraulic pressure P1) is set. Thereby, in the startup phase, the stationary clutch device 26 and the like are quickly and reliably operated against friction.

A timing t1 when the slave hydraulic pressure Ps has reached the first target hydraulic pressure (first control target value) P1 corresponds to a movement start timing (a stroke start timing) of the gap Ga. The start phase is from a system start timing t0 to a stroke start timing t1. A time period tf1 of the startup phase is about 60 msec.

The ECU 60 transitions to the stroke phase so that the stroke of the clutch device 26 starts at the timing t1 when the slave hydraulic pressure Ps has reached the first target hydraulic pressure P1. In the stroke phase, the slave hydraulic pressure Ps is allowed to follow the target hydraulic pressure Pt during a sufficient time period according to the setting of a duty ratio of a main term which is an I term. The target hydraulic pressure Pt in the stroke phase is set to be lower than the target hydraulic pressure Pt (the first target hydraulic pressure P1) in the startup phase. When the clutch device 26 starts a stroke, the friction acting on the inside of the clutch device 26 and the clutch actuator 50 changes (decreases) from static friction to dynamic friction. Also, it is desirable that the stroke of the clutch device 26 be stopped after ineffective stroke elimination is performed.

Thus, in the stroke phase, a relatively small target hydraulic pressure Pt (hereinafter referred to as a second target hydraulic pressure P2) is set. Thereby, in the stroke phase, the stroke of the clutch device 26 is gently performed with a lighter force than in the startup phase. Also, the slave hydraulic pressure Ps is restricted to an extent that the stroke converges (the clutch device 26 is stationary) after the ineffective stroke elimination is performed and the duty ratio Du is reduced.

For example, the ECU 60 determines that the stroke of the clutch device 26 has been stopped at a timing t2 when a predetermined specified time period (for example, 300 msec) tf2 has elapsed after the target hydraulic pressure Pt was set to the second target hydraulic pressure (the second control target value) P2 and transitions to the standby transition phase. In the standby transition phase, an amount of change (a change rate) with respect to a time period of the target hydraulic pressure Pt is limited and the target hydraulic pressure Pt is gently reduced. A slope A1 of the line Pt in FIG. 8 corresponds to the above-described change rate (change speed) of the target hydraulic pressure Pt. The change rate in the standby transition phase is about 0.1 kpa/msec. The stroke stop state is maintained by limiting the change rate of the target hydraulic pressure Pt and decreasing the target hydraulic pressure Pt. That is, the friction (static friction) of the clutch device 26 that has been stationary is effectively utilized to reduce the target hydraulic pressure Pt and the duty ratio Du in a state in which the target gap is maintained. In the standby transition phase, a third target hydraulic pressure (a third control target value) P3, which is lower than the second target hydraulic pressure P2, is set. The transition to the standby transition phase may be included on condition that the stroke stop has been continued for a predetermined time period.

After the target hydraulic pressure Pt is set to the third target hydraulic pressure P3, the ECU 60 transitions to the start standby phase, for example, at the timing t3 when a predetermined second specified time period (for example, 50 msec) tf3 has elapsed. At this time, the target hydraulic pressure Pt is reduced in a state in which the gap Ga is maintained. That is, in the start standby phase, the target hydraulic pressure Pt and the duty ratio Du are set so that they are reduced to an extent that the gap Ga does not return. In the start standby phase, the friction (the static friction) of the clutch device 26 is effectively utilized to maintain the above-described standby state. At this time, the stroke of the clutch device 26 is not performed in either the connection direction or the disconnection direction and the duty ratio Du to be retained is reduced. The transition to the start waiting phase may be included on condition that the target gap has been continuously maintained during a predetermined time period.

As described above, in the present embodiment, in the system for connecting and disconnecting the clutch device 26 in accordance with the hydraulic pressure, the target hydraulic pressure Pt at the time of the system startup and at the time of the start of the stroke of the clutch device 26 (the startup phase) is set to be higher than the target hydraulic pressure Pt during the stroke of the clutch device 26 (the stroke phase). For example, when the same control has been performed in the startup phase and the subsequent stroke phase, an operation timing and an amount of operation of the clutch device 26 may vary with friction (static friction) within the clutch device 26. On the other hand, by setting the target hydraulic pressure Pt at the time of the start of the stroke to a high pressure, the operation of the clutch device 26 is stabilized.

Also, the target hydraulic pressure Pt after the stroke of the clutch device 26 is completed is set to the third target hydraulic pressure P3, which is lower than the second target hydraulic pressure P2 during the stroke of the clutch device 26 and an electric current of the motor (the duty ratio Du) is reduced. After the stroke of the clutch device 26 is completed (during the stationary time), the phase transitions to the start standby phase through the standby transition phase. In the standby transition phase, the hydraulic pressure change rate is limited and the target hydraulic pressure Pt is changed (decreased) to the third target hydraulic pressure P3, which is lower than the second target hydraulic pressure P2 during the stroke. In the standby transition phase, the friction of the clutch device 26 that has been stationary is effectively utilized to maintain the above-described standby state and the electric current of the motor (the duty ratio Du) is reduced.

As described above, the target hydraulic pressure Pt at the time of the system startup is set to be high and the subsequent gap movement is controlled by the three-stage target hydraulic pressure Pt, so that the operability and stability of the gap position at the time of the start standby are improved and an electric current of the motor (the duty ratio Du) is reduced.

In the startup phase immediately after the system startup, feedback control is performed on main terms of the P term (a deviation term) and the D term (a differential term). In the startup phase, because the state of the clutch device 26 changes significantly, the feedback control on the main terms which are the P term and the D term is performed according to the change and the responsiveness of the target hydraulic pressure Pt is improved.

In the stroke phase after the startup phase, the feedback control on a main term which is the I term (an integral term) is performed. A measured hydraulic pressure (slave hydraulic pressure Ps) in the stroke phase corresponds to a hydraulic pressure for coping with a sum of a load corresponding to a reaction force of a return spring or the like that returns the clutch device 26 to the initial state before ineffective stroke elimination, a load corresponding to the pressure loss of an oil path, and friction of the seal or the like inside the clutch actuator 50. During the stroke of the clutch device 26, even if the duty ratio Du of the motor control of the clutch actuator 50 is high, the slave hydraulic pressure Ps only copes with the sum of the return spring load and the pressure loss. In the stroke phase, ineffective stroke elimination of the clutch device 26 is performed. However, at this time, the slave hydraulic pressure Ps is controlled by the basic I term because the deviation from the target hydraulic pressure Pt is small.

Figure 9:
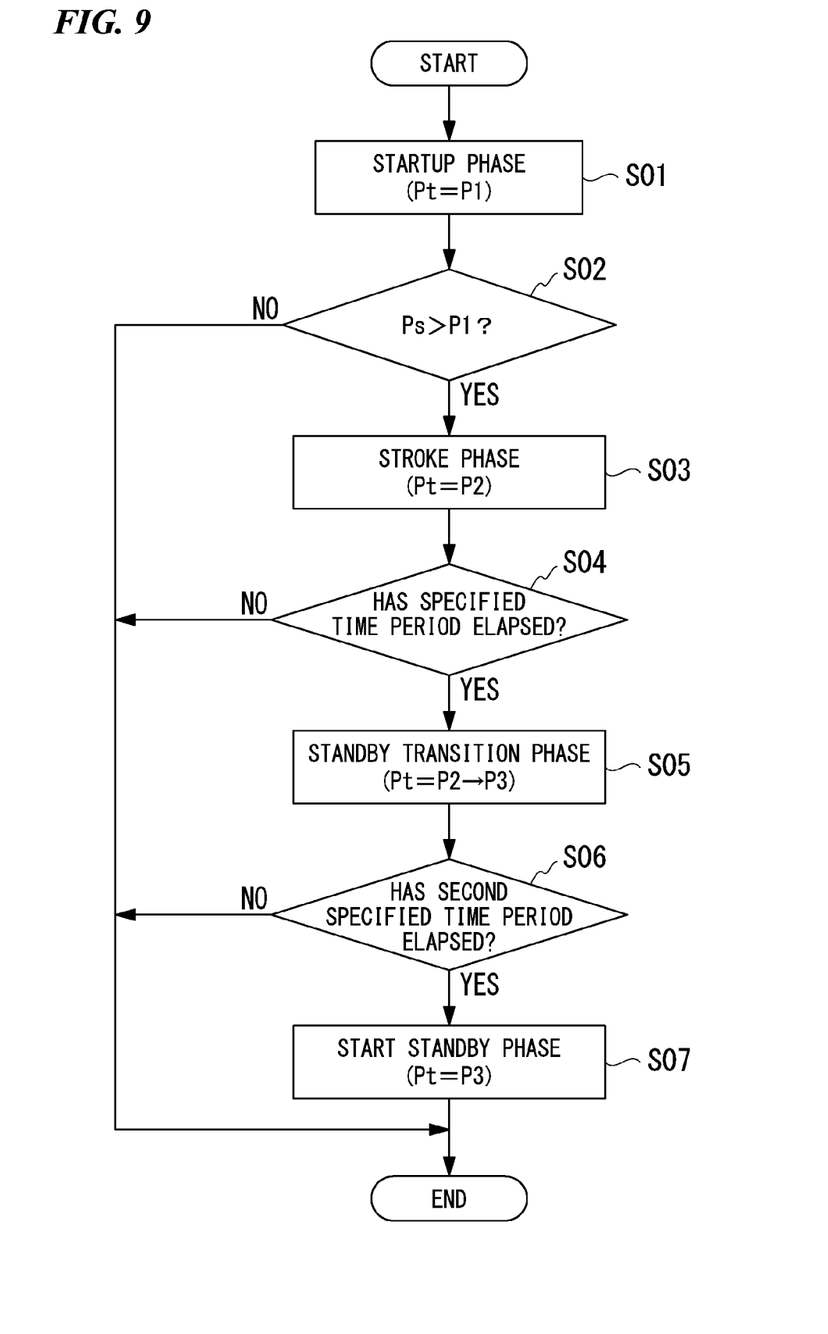
FIG. 9 is a flowchart illustrating a control flow in the clutch control device according to the embodiment of the present invention.

Next, an example of a process performed by the ECU 60 when switching of the above-described feedback control is performed at the time of system startup will be described with reference to the flowchart of FIG. 9. This control flow is iteratively executed at specified control intervals (1 to 10 msec).

First, when the system is started, the ECU 60 transitions to the startup phase (step S1). In the startup phase, the relatively large first target hydraulic pressure P1 is set as the target hydraulic pressure Pt. In the startup phase, the slave hydraulic pressure Ps is allowed to respond quickly to the first target hydraulic pressure P1 according to feedback control (duty ratio setting) on main terms which are the P term and the D term. The ECU 60 measures the slave hydraulic pressure Ps from a value detected by the downstream-side hydraulic pressure sensor 58.

Next, the ECU 60 determines whether or not the measured slave hydraulic pressure Ps has reached (exceeded) the first target hydraulic pressure P1 (step S2). When the slave hydraulic pressure Ps has not reached the first target hydraulic pressure P1 (NO in step S2), the process is temporarily ended. When the slave hydraulic pressure Ps has reached the first target hydraulic pressure P1 (YES in step S2), the phase transitions to the stroke phase in step S3. In the stroke phase, the relatively small second target hydraulic pressure P2 is set as the target hydraulic pressure Pt. In the stroke phase, the slave hydraulic pressure Ps is allowed to follow the second target hydraulic pressure P2 during a sufficient time period according to the feedback control (duty ratio setting) on a main term which is the I term.

Next, the ECU 60 determines whether or not the above-described specified time period has elapsed after the transition to the stroke phase (step S4). When the specified time has not elapsed (NO in step S4), the process is temporarily ended. When the specified time period has elapsed (YES in step S4), the phase transitions to the standby transition phase in step S5. In the standby transition phase, the target hydraulic pressure Pt is decreased from the second target hydraulic pressure P2 to the third target hydraulic pressure P3. In the standby transition phase, the target hydraulic pressure Pt and the duty ratio Du are gently reduced by limiting the change rate of the target hydraulic pressure Pt. Thereby, it is possible to maintain the target gap by eliminating the gap return while reducing the duty ratio Du.

Next, the ECU 60 determines whether or not the above-described second specified time period has elapsed after the transition to the standby transition phase (step S6). When the second specified time period has not elapsed (NO in step S6), the process is temporarily ended. When the second specified time period has elapsed (YES in step S6), the phase transitions to the start standby phase in step S7. In the start standby phase, the third target hydraulic pressure P3 is set as the target hydraulic pressure Pt. In the start standby phase, the target hydraulic pressure Pt and the duty ratio Du are reduced to an extent that there is no gap return and then the above-described standby state can be maintained.

As described above, the clutch control device 60A according to the above-described embodiment includes the engine 13, the transmission 21, the clutch device 26 configured to connect and disconnect motive power transmission between the engine 13 and the transmission 21, the clutch actuator 50 configured to drive the clutch device 26 and change a clutch capacity, and the ECU 60 configured to calculate a target value (the target hydraulic pressure Pt) of a control parameter (the slave hydraulic pressure Ps) for the clutch capacity, wherein, when the target value of the control parameter immediately after the system startup is set as the first target hydraulic pressure P1 and the target value of the control parameter during clutch stroke at the time of the system startup is set as the second target hydraulic pressure P2, the ECU 60 sets the first target hydraulic pressure P1 to a value greater than the second target hydraulic pressure P2.

According to this configuration, immediately after the system startup, the clutch device 26 and the clutch actuator 50, which have been stationary, can be quickly operated against various frictions according to the relatively large first control hydraulic pressure P1. Thereby, it is possible to restrict a variation in the stroke start of the clutch device 26 that has been stationary and to quickly and reliably perform ineffective stroke elimination for the clutch device 26 (the cancellation of a backlash or operating reaction force of each part, the application of a preload to a hydraulic path, or the like).

Also, because the friction between the clutch device 26 and the clutch actuator 50 is reduced after the stroke of the clutch device 26 is started, the stroke of the clutch device 26 can easily converge according to the relatively small second control hydraulic pressure P2.

The clutch control device 60A includes a control parameter sensor (the downstream hydraulic pressure sensor 58) configured to detect the control parameter (the slave hydraulic pressure Ps), wherein, when the control parameter detected by the control parameter sensor has reached the first control target value P1 at the time of the system startup, the ECU 60 switches the target value of the control parameter from the first control hydraulic pressure P1 to the second control hydraulic pressure P2.

According to this configuration, immediately after the system startup, the clutch device 26 and the clutch actuator 50, which have been stationary, are quickly operated according to the relatively large first control hydraulic pressure P1 and the stroke of the clutch device 26 can be reliably performed. Also, after the actually measured value of the control parameter reaches the first control hydraulic pressure P1 (after the stroke of the clutch device 26 is started), the stroke of the clutch device 26 can easily converge by the control target value being switched to the relatively small second control hydraulic pressure P2.

In the clutch control device 60A, after the target value of the control parameter is switched to the second control hydraulic pressure P2, the ECU 60 switches the target value of the control parameter to the third control hydraulic pressure P3 smaller than the second control hydraulic pressure P2 when the stroke of the clutch device 26 has been stopped.

According to this configuration, it is possible to maintain a stroke stop state by effectively utilizing the friction of the clutch device 26 that has been stationary when the stroke of the clutch device 26 has been stopped after the clutch device 26 was allowed to stroke and ineffective stroke elimination was performed after the system startup. Also, in the stroke stop state, the target value of the control parameter of the clutch device 26 is switched to the relatively small third control hydraulic pressure P3, so that the power consumption of the clutch actuator 50 can be restricted while the stroke stop state is maintained.

In the clutch control device 60A, the ECU 60 switches the target value of the control parameter to the third control hydraulic pressure P3 after the second control hydraulic pressure P2 is continued for a predetermined specified time period tf2.

According to this configuration, it is possible to secure a stroke time period of the clutch device 26 and reliably perform ineffective stroke elimination of the clutch device 26 by continuing the second control hydraulic pressure P2 for a specified time period tf2.

In the clutch control device 60A, when the target value of the control parameter is switched from the second control hydraulic pressure P2 to the third control hydraulic pressure P3, the ECU 60 sets a change speed of the target value of the control parameter to a speed lower than or equal to a predetermined target speed.

According to this configuration, when the target value of the control parameter is switched from the second control hydraulic pressure P2 to the third control hydraulic pressure P3, a change speed of the target value of the control parameter is limited to a predetermined value or less, so that it is possible to maintain a stroke stop state by effectively utilizing the friction of the clutch device 26 that has been stationary and restrict the power consumption of the clutch actuator 50.

The present invention is not limited to the above-described embodiment. For example, the present invention is not limited to the application to a configuration in which the clutch is connected by increasing the hydraulic pressure and the clutch is disconnected by decreasing the hydraulic pressure. The present invention may be applied to a configuration in which the clutch is disconnected by increasing the hydraulic pressure and the clutch is connected by decreasing the hydraulic pressure.

The clutch operating element is not limited to the clutch lever 4b and a clutch pedal or various other operating elements may be used as the clutch operating element.

The application is not limited to a saddle-ride type vehicle in which the clutch operation is automated as in the above-described embodiment. The present invention can also be applied to a saddle-ride type vehicle including a so-called clutch operation-less transmission device configured to enable a shift by adjusting a driving force without performing the manual clutch operation under predetermined conditions while a manual clutch operation is basically performed.

Also, the above-described saddle-ride type vehicle includes all vehicles in which the driver rides across the vehicle body and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles and vehicles including an electric motor as a prime mover.

The configuration in the above-described embodiment is an example of the present invention and various modifications can be made without departing from the spirit of the present invention.

BRIEF DESCRIPTION OF THE REFERENCE SYMBOLS

1: Motorcycle (saddle-ride type vehicle)
13: Engine (motor)
21: Transmission
26: Clutch device
50: Clutch actuator
58: Downstream-side hydraulic pressure sensor (control parameter sensor)
60: ECU (control unit)
60A: Clutch control device
Ps: Slave hydraulic pressure (control parameter)
Pt: Target hydraulic pressure (target value)
P1: First target hydraulic pressure (first control target value)
P2: Second target hydraulic pressure (second control target value)
P3: Third target hydraulic pressure (third control target value)
tf2: Specified time period

What is claim is:
1. A clutch control device comprising:
  an engine;
  a transmission;
  a clutch device configured to connect and disconnect motive power transmission between the engine and the transmission;

a clutch actuator configured to drive the clutch device and change a clutch capacity; and a control unit configured to calculate a target value of a hydraulic pressure for the clutch capacity, wherein, when the target value of the hydraulic pressure immediately after initiation of system startup is set as a first control target value and, during the system startup, based on a clutch stroke being initiated, the target value of the hydraulic pressure is set as a second control target value, the control unit is configured to set the first control target value to a value greater than the second control target value.

2. The clutch control device according to claim 1, further comprising a control parameter sensor configured to detect an actually measured value of the hydraulic pressure, wherein, when the hydraulic pressure detected by the control parameter sensor has reached the first control target value at the time of the system startup, the control unit is configured to switch the target value of the hydraulic pressure from the first control target value to the second control target value.

3. The clutch control device according to claim 2, wherein, after the target value of the hydraulic pressure is switched to the second control target value, the control unit is configured to switch the target value of the hydraulic pressure to a third control target value smaller than the second control target value when a stroke of the clutch device has been stopped.

4. The clutch control device according to claim 3, wherein the control unit is configured to switch the target value of the hydraulic pressure to the third control target value after the second control target value is continued for a predetermined specified time period.

5. The clutch control device according to claim 4, wherein, when the target value of the hydraulic pressure is switched from the second control target value to the third control target value, the control unit is configured to set a change speed of the target value of the hydraulic pressure to a speed lower than or equal to a predetermined target speed.

6. The clutch control device according to claim 3, wherein, when the target value of the hydraulic pressure is switched from the second control target value to the third control target value, the control unit is configured to set a change speed of the target value of the hydraulic pressure to a speed lower than or equal to a predetermined target speed.

7. The clutch control device according to claim 1, wherein, after the target value of the hydraulic pressure is switched to the second control target value, the control unit is configured to switch the target value of the hydraulic pressure to a third control target value smaller than the second control target value when a stroke of the clutch device has been stopped.

8. The clutch control device according to claim 7, wherein the control unit is configured to switch the target value of the hydraulic pressure to the third control target value after the second control target value is continued for a predetermined specified time period.

9. The clutch control device according to claim 8, wherein, when the target value of the hydraulic pressure is switched from the second control target value to the third control target value, the control unit is configured to set a change speed of the target value of the hydraulic pressure to a speed lower than or equal to a predetermined target speed.

10. The clutch control device according to claim 7, wherein, when the target value of the hydraulic pressure is switched from the second control target value to the third control target value, the control unit is configured to set a change speed of the target value of the hydraulic pressure to a speed lower than or equal to a predetermined target speed.

* * * * *